Oct. 16, 1962     C. A. ROE ET AL     3,059,105
TRAILER LIGHT SUPPORT
Filed April 20, 1961     2 Sheets-Sheet 1
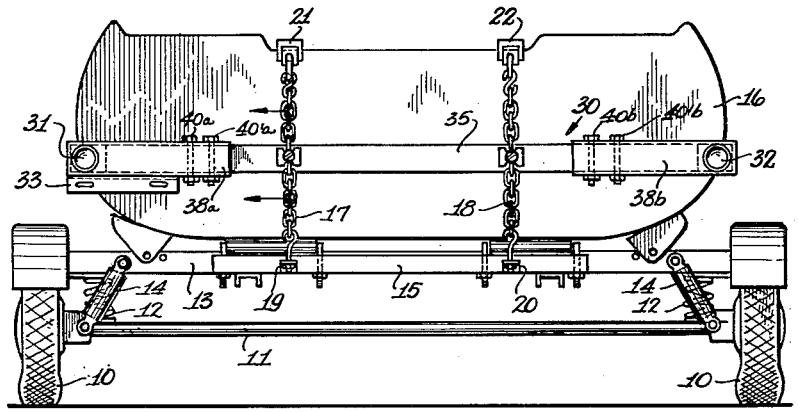
Fig. 1.
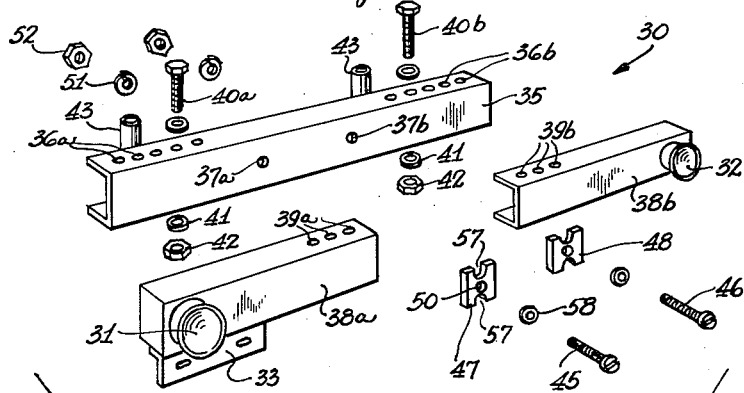
Fig. 2.
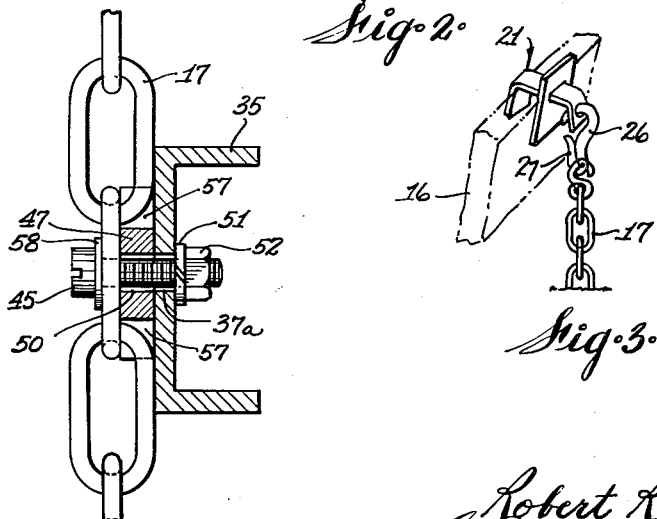
Fig. 3.
Fig. 4.
INVENTORS
Robert L. Roe
Charles A. Roe
BY
Harold A. Weir
ATTORNEY Oct. 16, 1962 C. A. ROE ET AL 3,059,105
TRAILER LIGHT SUPPORT
Filed April 20, 1961 2 Sheets-Sheet 2

INVENTORS
Charles A. Roe
Robert R. Roe
BY
Harold G. Weir
PATENT AGENT 3,059,105
TRAILER LIGHT SUPPORT
Charles A. Roe and Robert R. Roe, both of 614 Woolwich St., Guelph, Ontario, Canada
Filed Apr. 20, 1961, Ser. No. 104,358
4 Claims. (Cl. 240—8.3)

This application is a continuation-in-part of application Serial No. 85,314, filed Jnauary 27, 1961.

This invention relates to a trailer light support, and in particular it relates to a detachable support for providing lights for the rear of a trailer.

Trailers that are in current use for transporting boats and the like, normally have the trailer lights mounted in a fixed position at the rear of the trailer or underneath the trailer towards the rear. The lights may include stop-lights, clearance lights and turn signal lights. The lights are not always in a position to provide the best visibility and it is, of course, desirable to mount the lights where the visibility is best and in accordance with local regulations. For example, a boat frequently overhangs the rear of the trailer carrying it, and lights mounted on the rear of the trailer are sometimes partly obscured by the overhang. Further, the clearance lights, or lights that indicate the width of the trailer load are not adjustable on prior art trailers and provide a poor indication of load width in the cases where the load exceeds the width of the trailer. Another disadvantage in prior fixed light arrangements on trailers used to carry boats is that the lights and wiring are submerged when the boat is launched or loaded.

This invention seeks to overcome the disadvantages of the prior art trailer lighting arrangements by providing a light support that is adjustable in width and that can be detachably mounted at a suitable height at the rear of a trailer.

It is therefore an object of this invention to provide a detachable light support for a trailer.

It is another object to provide a light support that can be quickly attached at the rear of a trailer at a suitable height.

It is yet another object of this invention to provide a detachable trailer light support that is adjustable in width so that clearance lights can be positioned to mark the width of the trailer or load.

It is a further object of this invention to provide a mounting arrangement for a light support that can be operated quickly to mount or dismount the light support from the trailer.

Figure 5:
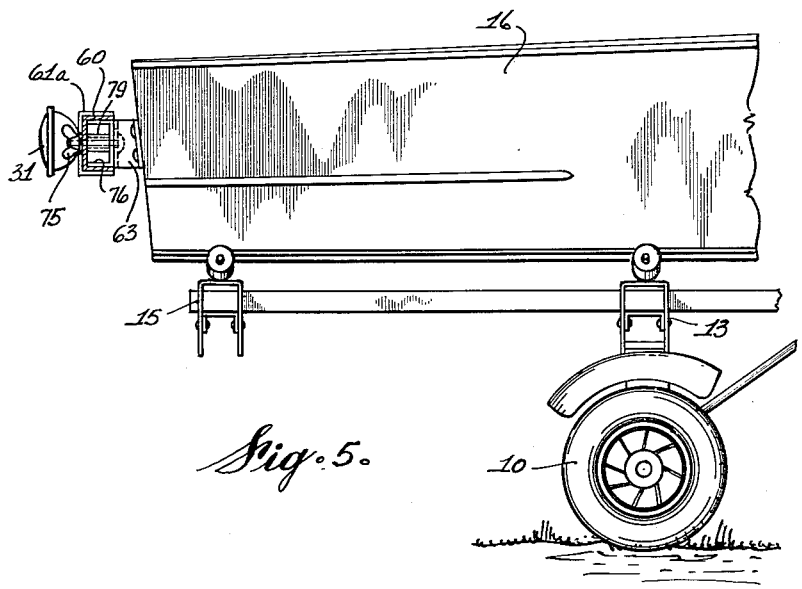
Figure 6:
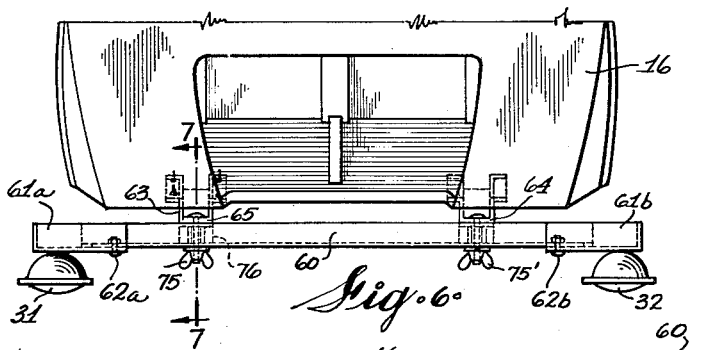
Figures 7, 8:
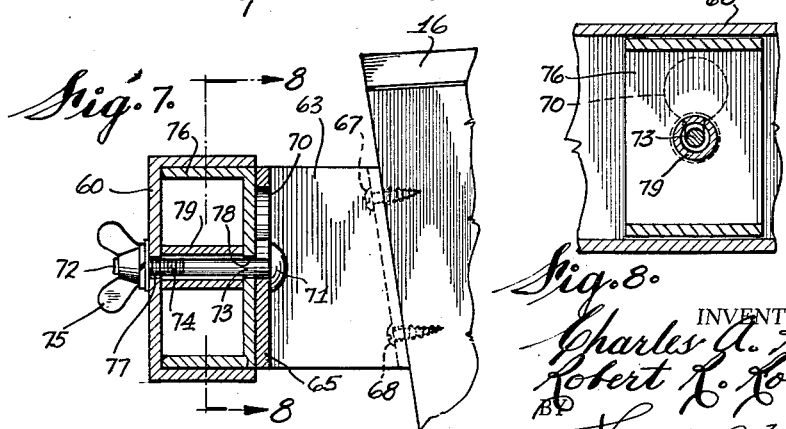

Further objects and advantages of the invention will appear from the following description taken in conjunction with the drawings in which:

FIGURE 1 is a rear view of a boat trailer with a loaded boat and a trailer light support according to one embodiment of the invention in position at the rear of the trailer, FIGURE 2 is an exploded isometric view showing parts of the light support, FIGURE 3 is an isometric view showing a portion of a chain to which the light support may be fastened and indicating one known manner of fastening the chain to the boat or to the trailer, FIGURE 4 is a sectional view of a portion of a chain on an enlarged scale showing the chain fastened to the light support according to the invention, FIGURE 5 is a partial side view showing the rear portion of a boat trailer with a loaded boat and a trailer light support according to another embodiment of the invention in position at the rear of the boat, FIGURE 6 is a partial top view of the rear of a boat with the trailer light support of FIGURE 5 in position, FIGURE 7 is a sectional view taken along lines 7—7 of FIGURE 6, and FIGURE 8 is a sectional view taken along lines 8—8 of FIGURE 7.

Referring to FIGURE 1 there is shown the rear view of a boat trailer with a loaded boat. The boat trailer is used by way of example to show the positioning of a trailer light support according to one embodiment of the invention. The boat trailer has wheels and tires 10 which rotate on axle member 11. Springs 12 and shock absorbers 14 are between the wheel assembly and a frame member 13 on each side. A tail member 15 extends rearward to form the rear of the trailer. Such boat trailers are well known.

A boat 16 is shown mounted on the trailer. Two chains 17 and 18 extend from brackets 19 and 20 on tail member 15 around the stern of the boat 16 and are fastened to brackets or clamp members 21 and 22, respectively, on the stern of the boat. When the boat is secured to the trailer the chains 17 and 18 are taut so that the boat is held against the trailer at the rear. The front of the boat should of course, be secured to the trailer also.

One convenient way of tightening and clamping the chains 17 and 18 is shown in FIGURE 3, where a portion of chain 17 is shown. A bracket or clamp member, or any equivalent member that can be affixed to the stern of the boat, is shown as 21. A hook 26 with clamping lever 27 is fastened to one end of the chain. When the boat 16 is to be secured to the trailer, the hook 26 is inserted in the bracket 21 and the clamping lever 27 is moved to the closed position to tighten the chain. The arrangement of clamping lever 27 and hook 26 is such that the lever has an over-center movement which locks the lever in the closed or tightened position. As previously noted, such tightening and clamping means are known.

The two chains 17 and 18 serve as the members to which the light support according to one embodiment the present invention is attached. The light support is indicated generally in FIGURE 1 as a unit 30. The light support unit 30 has two light assemblies 31 and 32 mounted on either end. These light assemblies may include the usual multiple filament bulbs to provide clearance lights, stop-lights, turn-signal lights, and a light to illuminate the license plate (not shown) mounted on bracket 33. It will be apparent that the light assemblies 31 and 32 may include separate bulbs to provide any or all of the functions mentioned and if separate bulbs are used they may be mounted in separate holders of "lights."

The detail of the light support unit 30 is best described with reference to FIGURE 2 in which a rigid center member 35 is provided with a series of spaced holes 36a and a series of spaced holes 36b, one series of holes towards each side of the center member 35. The center member 35 is conveniently of a channel-like section, that is of substantially C-shaped cross section having three straight legs, although a closed rectangular section, a partly curved section, or equivalent section would be satisfactory. Two holes 37a and 37b are provided in member 35 in the center leg of the channel to afford means by which the member is affixed to the trailer as will be described hereinafter.

Two rigid side members 38a and 38b are constructed to fit over the center member 35 and slidably engage the center member. The side member 38a is provided with holes 39a and the side member 38b is provided with holes 39b. The location of the holes 39a are such that when side members 38a is in position on center member 35, the side member 38a can be slid along the center member 35 to several positions where at least one of the holes 39a is in registry with one of the holes 36a. The spacing of the holes 36a and 39a is preferably such that at least a pair of holes 39a are in registry with a pair of holes 36a at each selected position. This would, of course, not be the case in the extreme inwards and outwards positions of registry where only one hole would be in registry. However, if equal spacing of the holes were used, at least a pair of holes would be in registry at all the intermediate positions. The same location of holes would apply to a consideration of the other side member 38b, that is, would apply to holes 36b and 39b.

A rod-like fastening member 40a is inserted through one set of holes 36a and 39a to fix or lock the side member 38a in position on the center member 35. It will be apparent that the use of two rod-like fastening members, 40a and 40a' as shown in FIGURE 1 for example, will increase the rigidity of the locking of member 38a to member 35. As mentioned in connection with the spacing of the holes 39a and 36a, it would be possible to use two rod-like fastening members in all of the available positions where there are holes in registry with one another except for the extreme positions.

Similarly for side member 38b, the rod-like fastening members 40b and 40'b (FIGURE 1) are used to lock the side member 38b to the center member 35. As before, only one such fastening member would be used in the extreme inwards and outwards positions of side member 38b. Only one locking member on each side, namely 40a and 40b is shown in FIGURE 2 to simplify the drawing.

It will be seen that the side members 38a and 38b with the center member 35 form an extensible unit which may be locked in one of several selectable widths.

The rod-like fastening members 40a, 40'a, 40b, 40'b are shown as bolts where they appear in the drawings. The bolts are shown as being restrained or fastened by lock washers 41 and nuts 42. The use of bolts and nuts for the rod-like fastening members is a preferred embodiment and may include spacer cylinders 43 which fit in the back of the channel portion of center member 35 to prevent member 35 from deforming when the bolts are tightened. However, the rod-like fastening members could comprise studs or simply pins restrained by some suitable means.

It will be apparent that other means could be used for locking side members 38a and 38b to center member 35. For example, a clamping unit could be mounted on the back of each side member 38a and 38b to squeeze the back portions of the channel together and thereby bind the side members to the center member.

The side member 38a has a bracket 33 mounted on its underside towards the outer end. This bracket 33 is provided with holes to afford means to attach a license plate. The light assembly 31 provides light which is directed towards the bracket to illuminate a license plate when one is mounted on the bracket.

The "light" or light assembly 31 is mounted on side member 38a and the light assembly 32 is mounted on side member 38b. As was previously described, the light assemblies 31 and 32 may include clearance lights. By adjusting the side members 38a and 38b, a width of the light support unit 30 can be selected which is substantially the width of the trailer or load, whichever is larger. When the light support unit is properly mounted at the rear of the trailer, the clearance light portion of assemblies 31 and 32 will indicate the sides of the trailer or load.

In the drawings only rearward facing clearance lights are shown. It is often desirable to have clearance lights facing both rearwards and forwards. The rearward facing lights might normally be red while the forward facing clearance lights might be amber in colour. These lights which face in two directions would be mounted on the extreme end of side members 38a and 38b if a single double purpose light was to be used, or separate clearance lights could be used for both forward and rearward facing clearance lights. The side arms or side members 38a and 38b would, of course, be positioned so that the forward facing clearance lights extend outwards past the sides of the boat at the stern.

The extensible light support unit 30 is hung on or fastened to the chains 17 and 18 by hangers or rod-like fastening members 45 and 46 which pass through a link of each chain and through holes 37a and 38b, respectively. The rod-like fastening members 45 and 46 also pass through two similarly shaped brackets or washer-like devices 47 and 48 of unusual design. The bracket or washer-like device 47, or simply washer 47, is best seen in FIGURES 2 and 4. Washer 47 is generally H-shaped and has a central hole 50 with two indentations or deformations 57 in opposite edges. The washer 47, when it is in position, supports one link of chain 17 flat against its surface with the hole 50 substantially aligned with the center of the link lying flat on its surface. The two deformations 57 provide space for the ends of the links on each side of the supported link. A rod-like fastening member 45 passes through a link on chain 17, the hole 50, and the hole 37a, and is provided with some means to restrain it in its position. As was the case with fastening members 40, the rod-like fastening member 45 is conveniently restrained by a bolt restrained by a lock washer 51 and a nut 52. However, member 45 may, as before, be a stud or a pin held in position by a spring clip, cotter pin, or the like. A washer 58 may be required on bolt 45 depending on the head size of the bolt and the size of the links in chain 17.

Washer 48 is identical to washer 47 and is used in the same manner on chain 18. A similar fastening device, such as bolt 46 is used in conjunction with washer 48. The associated lock washer and nut are not designated in FIGURE 2.

It will be seen that the light support unit 30 can be positioned at different vertical levels by using different links in chains 17 and 18. The unit 30 can therefore be set at the most desirable height and in accordance with any local lighting regulations that might affect its positioning.

The light support is held in position by two hangers or rod-like fastening members 45 and 46 as was described. When these fastening members 45 and 46 are withdrawn, the unit 30 is free. The light support unit 30 is therefore easily removable. When, for example, the boat is to be launched, the unit 30 can be quickly removed and kept dry. It is easily remounted when needed.

Other flexible members or flexible lines are frequently used to fasten the stern of a boat to a trailer. One example of this is the use of a rope or cable. Ropes, cables and chains are referred to herein as "flexible lines" for ease of description. A light support according to this invention can be adapted to fasten to taut ropes or cables as well as to chains. When the support unit 30 is to be fastened to ropes, the washers 47 and 48 are not used. Instead washers accommodating the rope would be used. A washer provided with a hole and a straight depression across its surface to one side of the hole would be satisfactory. In such a mounting the washer is placed over the rope with the rope between the washer and the surface of member 35. The depression in the washer receives the rope to prevent it slipping out. Thus, to mount a trailer light support to a pair of ropes, two bolts are used with each bolt passing through the hole of such a washer. One bolt then passes through hole 37a and the other through 37b. A nut is placed on each bolt and tightened until the rope is securely squeezed between the washer and member 35. As with chains, two ropes are secured by washers and bolts through holes 37a and 37b.

Thus, a trailer light support, as set forth in the preceding embodiments provides trailer lights adjustable in width and height and that is quickly mounted and dismounted.

Referring now to FIGURES 5, 6, 7 and 8, there is shown a trailer light support according to another embodiment of the invention. In this embodiment, the trailer light support is adapted to be mounted directly to the stern of the boat or the like rather than to flexible lines over the stern of the boat. Such a mounting can be used when the boat is held to a trailer by means other than flexible lines over the stern of the boat. Minor changes of structure are also shown in FIGURES 5–8 to show some alternative structures that might be satisfactorily employed.

The light support unit, as before, comprises a rigid center member 60 that is conveniently of channel-like construction, and two rigid side members 61a and 61b which slidably engage the ends of member 60. In the previously described embodiments, the side members 38a and 38b were provided with vertically disposed holes registering with corresponding vertically disposed holes in center member 35 (see FIGURE 2). The embodiment of FIGURES 5–8 shows center member 60 provided with a series of horizontally disposed holes towards each end which may register with corresponding holes in side members 61a and b. The side members 61a and b are fixed to center member 60 at one of several positions by rod-like fastening member 62a and b passing through registering holes. The rod-like fasteners 62a and b are preferably bolts and nuts, and more than one may be used for each side member to increase the rigidity. Thus, the side members 61a and 61b with center member 60 form an extensible unit which may be locked in one of several selectable widths.

The extensible unit comprising members 60, 61a and b is fastened to the stern of the boat by mounting brackets 63 and 64 which are directly attached to the boat stern. The brackets 63 and 64 are generally U-shaped when viewed from top or bottom, that is they have a generally U-shaped horizontal section, with an outwardly turned flange at each side of the U. The brackets have holes in the flanges to receive screws to hold the brackets to the stern of the boat. Bracket 63 (shown in FIGURE 7) is shown attached to the stern of the boat by screws 67 and 68. Because it is desirable for the center-portion 65 of the bracket to be in a substantially vertical plane, the flanges are preferably not parallel to portion 65 but are at a small angle. The stern of the boat will usually have a small slope, and the angle of flanges will compensate for this so that portion 65 is substantially vertical.

In the center of each bracket 63 and 64 there is provided a keyhole shaped opening. While only bracket 63 is shown in FIGURES 7 and 8 of the drawings, it is to be understood that bracket 64 is of similar design. The keyhole shaped opening 70 in bracket 63 is of a size that will accommodate, in the upper or larger part, the head 71 of a hanger or bolt 72. The lower or smaller part of opening 70 will accommodate the stem or shaft 73 of hanger or bolt 72. Bolt 72 can thus be inserted, head first, through the upper part of opening 70 and moved down so that the shaft 73 passes through the lower part of opening 70.

Each side of the extensible unit comprising members 60, 61a and 61b is provided with at least one hole or horizontal slot. While these holes are conveniently spaced in center member 60, they may also be provided one in each side member should circumstances require it. The left hand side of the extensible unit (as shown in FIGURE 6) is thus provided with a hole 77 in center member 60 through which the shaft of bolt 72 passes. The end 74 of bolt 72 is threaded to engage a wing nut 75. A channel-shaped support 76, of substantially C-shaped section having three straight leg portions, fits inside member 60 to provide a back wall to bear against portion 65 of bracket 63. The support is reversely fitted within member 60 and the dimensions are such that the center leg of support 76 is substantially flush with the ends of the side leg portions of member 60. The support 76 is provided with a hole 78 to receive shaft 73. A cylindrical spacer 79 may be provided to prevent the center parts of member 60 and support 76 deforming when nut 75 is tightened.

The manner of mounting the light support is straightforward and little explanation is believed necessary. The center member 60 is held against the stern of the boat to mark the positions of mounting brackets 63 and 64. It is believed that only the description pertaining to bracket 63 and its associated parts need be given as this would also apply to the bracket 64. The hole 77 in member 60 indicates the position in which bracket 63 should be mounted. If a plurality of spaced holes 77 are provided in member 60, or if a slotted opening is used, there will be a greater choice of mounting places for bracket 63. The bracket is then attached to the stern of the boat by screws, and the support 76, spacer 79, bolt 72 and nut 75 are assembled on member 60 as shown. Suitable washers and lockwashers may, of course, be included. The head 71 is inserted through opening 70 in bracket 63 and moved down. The nut 75 is tightened to clamp member 60 to bracket 63. The description is the same for the mounting of bracket 64 and the clamping of the right hand side of the member 60 is accomplished in similar manner, as previously noted. The side members 61a and b can then be locked to the center member 60 at selected extension positions.

The light support can be quickly removed by loosening wing nuts 75 and 75′, sliding the support up so that the bolt heads clear the keyhole openings in the brackets, and moving the support away from the brackets.

It will be apparent that, unlike the previously described embodiments, the last embodiment pertains to a light support whose height cannot be changed without altering the position of the mounting brackets. However, the light support according to this last embodiment provides trailer lights adjustable in width and that can be quickly mounted and dismounted.

It will be apparent that the lights included in the lighting assemblies 31 and 32 may be connected with the appropriate circuits of a towing vehicle.

From the foregoing it will be apparent that an adjustable light support, capable of being quickly mounted and dismounted, has been shown and described.

We claim:

1. A light support affixable to the stern of a boat or the like carried by a trailer, said support comprising a straight rigid center member and two straight rigid side members longitudinally and slidably engaging said center member to form a straight extensible unit, said side members each having a length that is a minor portion of the length of said center member, said center member being provided with at least one hole towards each end, said side members each being provided with at least one hole adapted to register with one of the holes in said center member, first bolts extending through at least one of the holes in each side member and the registering hole in said center member, first nuts for each said first bolts to retain said bolts in position and lock said side members in selected positions at each end of said center member, at least one light mounted on each side member towards the end of said side member farthest from the other side member in said extensible unit, said center member being provided with a pair of spaced holes, a pair of second bolts received by said pair of spaced holes, said second bolts having a head and a threaded shaft portion, a pair of brackets each provided with a keyhole shaped opening therein, the larger part of said keyhole shaped opening accommodating the head of said second bolt and the smaller part accommodating the shaft portion of said second bolt, and second nuts threadedly engaging the threaded shaft of said second bolts and fastening said extensible unit to said brackets.

2. A light support according to claim 1 wherein each bracket is of a generally U-shaped horizontal section with outwardly extending flanges at the ends of the U, said flanges being provided with holes to receive screws to fasten said brackets to the stern of a boat or the like.

3. A light support affixable to the stern of a boat or the like carried by a trailer, said support comprising a rigid channel-like center member and two rigid channel-like side members fitting snugly over each end of said center member and longitudinally and slidably engaging said center member to form a straight extensible unit, said channel-like members being of a substantially C shaped cross-section comprising a straight center leg joining two straight side legs, fastening means locking said side members in a selected position on either end of said center member, at least one light mounted on each side member towards the end of said side member farthest from the other side member in said extensible unit, said extensible unit being provided with a pair of spaced holes in the center leg thereof, a pair of channel-like supports adapted to fit within said extensible unit, said supports being of substantially C shaped cross-section comprising a straight center leg joining two straight side legs, said supports being reversely fitted within said extensible unit with the center leg of each said support being substantially flush with the ends of the side legs of the channel-like members in said extensible unit, each said support being provided with a hole in the center leg thereof, a pair of bolts having a head and a threaded shaft portion, each of said bolts extending through one of said spaced holes in said extensible unit and a hole in one of said supports, a pair of brackets each provided with a keyhole shaped opening therein, the larger part of said keyhole shaped opening accommodating the head of one of said bolts and the smaller part accommodating the shaft portion of one of said bolts, and nuts threadedly engaging the threaded portion of the shaft of said bolts and fastening said extensible unit to said brackets.

4. A light support according to claim 3 further including a cylindrical spacer positioned over the shaft portion of each said bolt between the center legs of said extensible unit and said support.

References Cited in the file of this patent

UNITED STATES PATENTS

| | | |
|---|---|---|
| 1,032,607 | Ingalls | July 16, 1912 |
| 2,353,035 | Hopp et al. | July 4, 1944 |
| 2,569,518 | Deutsch et al. | Oct. 2, 1951 |
| 2,783,367 | Locke | Feb. 26, 1957 |
| 2,787,476 | Holsclaw | Apr. 2, 1957 |
| 2,907,295 | Delaney | Oct. 6, 1959 |

FOREIGN PATENTS

| | | |
|---|---|---|
| 1,124,011 | France | June 25, 1956 |